No. 653,289. Patented July 10, 1900.
W. T. DAVIS.
GRINDING MILL.
(Application filed May 23, 1899.)
(No Model.)
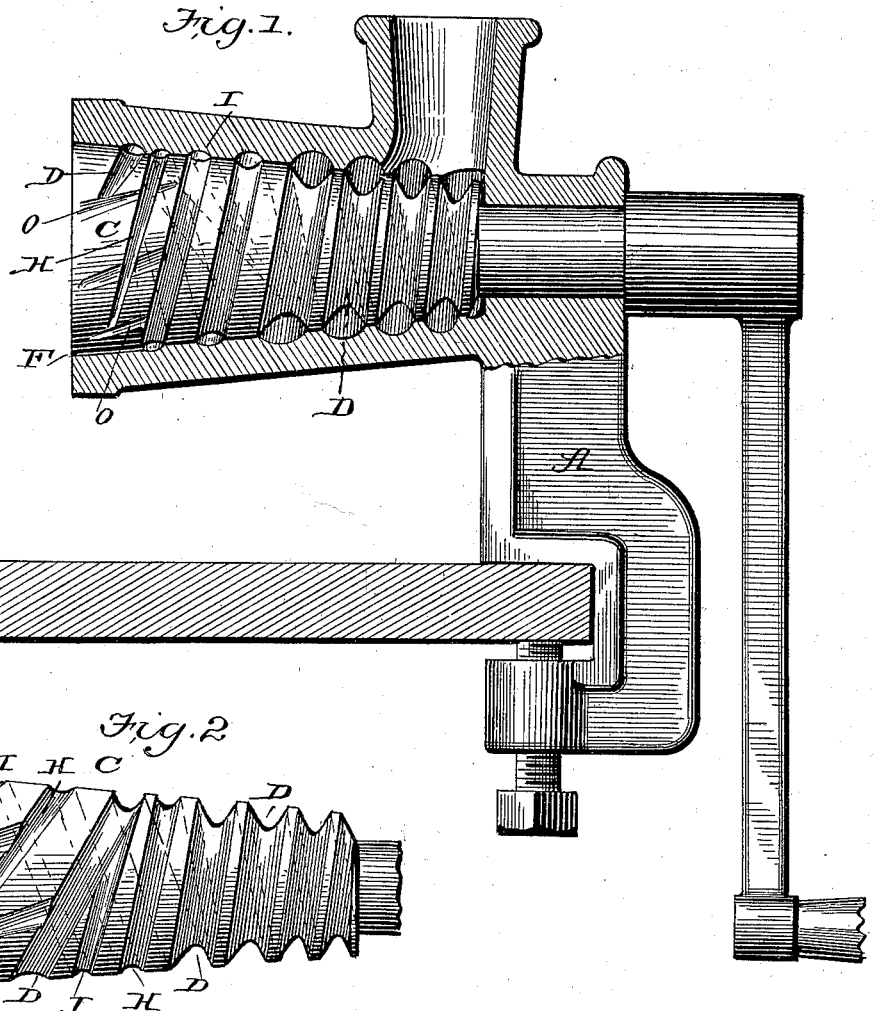
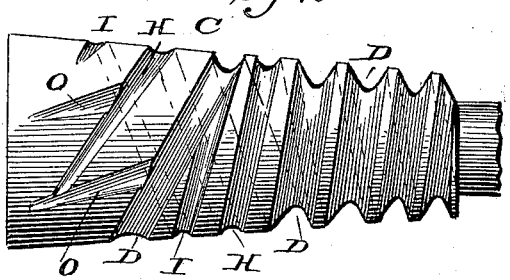
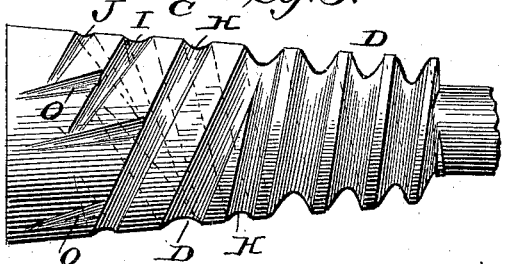
WITNESSES:
M. Leonard.
N. C. Johnson.
INVENTOR
William T. Davis.
BY
Hensen & Robinson
ATTORNEY

UNITED STATES PATENT OFFICE.

WILLIAM T. DAVIS, OF BATTLE CREEK, MICHIGAN.

GRINDING-MILL.

SPECIFICATION forming part of Letters Patent No. 653,289, dated July 10, 1900.

Application filed May 23, 1899. Serial No. 717,881. (No model.)

*To all whom it may concern:*

Be it known that I, WILLIAM T. DAVIS, a citizen of the United States, residing at Battle Creek, in the county of Calhoun and State of Michigan, have invented certain new and useful Improvements in Grinding-Mills; and I do declare the following to be a full, clear, and exact description of the invention, such as will enable others skilled in the art to which it appertains to make and use the same, reference being had to the accompanying drawing, which forms a part of this specification.

My invention relates to improvements in grinding-mills employing a grinding-screw of conical shape rotating in a correspondingly-shaped casing that is spirally grooved internally and which screw and also casing have a smooth ungrooved grinding portion at the discharge end, the grooved portions serving to partly reduce the material to be ground and to feed it to the smooth grinding parts.

The object of the invention is to so arrange the shape and proportions of the grinding-cone and its casing and of the various grooves that the material being reduced will be more quickly forced into and between the final grinding-surfaces and there reduced and then ejected than heretofore and with a great saving of the power required to operate the mill.

Referring to the accompanying drawing, in which like letters of reference indicate the same parts, A represents the casing of my preferred form of construction, consisting of a conical shell with the hopper or feeding-aperture B at the smaller end of the cone and a bracket for clamping to a table or other convenient place. The grinding-screw C is tapered correspondingly with the bore of the casing for a greater portion of its length, the extremity c of the screw having a bearing in a same-sized aperture in the casing and having attached thereto a handle, as shown, or other means for giving rotation to the screw.

I preferably make the grinding-screw and casing of a very slight taper, so as to cause very little resistance tending to separate them on the endwise bearing, which may be of any suitable construction.

The grinding-cone C has a rather large groove D beginning at the smaller end of its conical portion and continuing regularly around its periphery for about half the distance toward the discharge end and which groove preferably very gradually increases in size up to the said middle part, where it goes off toward the extremity of the cone at a greater pitch than before, and at which middle part another groove H diverges from the groove D, at the inner side thereof. The portion of the groove D from this divergence is marked as groove D'. Other grooves I and J diverge from the groove D' at its inner side, and all of these grooves D', H, I, and J become shallower from their beginning at the said middle portion until they merge into the convex surface of the cone a short distance from the larger extremity. In addition to these grooves I form a number of short grooves O O O, which diverge from the grooves D' H I J in a more nearly axial direction and which short grooves receive at their sides the extremities of the said grooves D' H I J, as shown in the figure. If preferred, the grooves D' H, &c., may intersect the said short grooves O, as do the grooves H and O in the figure. These grooves O O also all decrease in size from their beginning and merge into the convex surface of the cone. Thus it will be seen that at the discharge end of the cone there is a smooth portion around the entire circumference for a short distance back. The casing in which the grinding-cone operates is similarly grooved, as shown in the figure. My preferred form is to have the casing to exactly correspond with the cone in the size and arrangement of the various grooves; but good results are obtained by having only a part of this grooved construction or even simply a single groove, like the groove D, which shall merge into a smooth grinding portion at the discharge end, which smooth portion will engage the smooth portion of the grinding-cone.

In the operation of the mill the nuts or other material to be reduced are fed by the hopper into the groove D and but slightly crushed, and then forced onward to the middle portion of the mill without further reducing. Here the groove D separating into a number of smaller grooves, the stuff is separated into several portions and further reduced, and it is still further separated and reduced by the small grooves O O until it is, in a rather fine state, forced between the smooth grinding-surfaces at a number of places all around its periphery, where the material is finally ground into a very fine meal, powder, or pulp.

The object of having a number of grooves branching off from the larger one is to assist in carrying the material to the front or grinding portion of the mill and prevent the main groove from becoming clogged. The back or rear half of the screw acts as a conveyer, and it is desirable to have the material crushed as little as possible until it reaches the front end of the mill. The form of screw is an advantage. As it increases in size its carrying capacity is increased and enables it to get the material to be ground out of the way as fast as the front end can take it from the hopper and also gives it a larger grinding capacity at the discharge end, which will reduce the material to a pulp or "butter," as it is called, as fast as the material can be taken into the mill, and thus prevent clogging. The above features, combined with the fact of the slightly-tapered screw and casing, will do the work with much less labor than heretofore and with less wear on the bearing at the back end of the mill, which holds the screw in position inside the casing.

Having thus described my invention, what I claim is—

1. The combination in a mill of the character described, of a casing having spiral grooves and a smooth grinding portion at its discharge end and also a hopper to feed the same at the other end, a tapered grinding-screw within the said casing having a smooth grinding portion at its discharge end to engage the said smooth grinding portion of the said casing, the said casing and grinder being correspondingly tapered and fitting each other sufficiently closely to coact with each other and being provided with screw-threads as aforesaid, and with additional angular grooves diverging from said screw-threads, which receive, intermediate of their length, the extremities of said screw-threads, said screw-threads and grooves all becoming shallower until they merge into the said smooth grinding portions to partly reduce the kernels and force them between the said smooth grinding portions, substantially as set forth and for the purposes described.

2. The combination in a mill of the character described, of an internally-tapered casing having spiral grooves and a smooth grinding portion at its discharge end, and also a hopper to feed the mill at the other end, a tapered grinding-screw within the said casing having a smooth grinding portion at its discharge end to engage the said smooth grinding portion of the casing, said grinding-cone having a thread D encircling it regularly for a portion of its length, but gradually increasing in size, and then running at a greater pitch toward the discharge end and having a number of grooves H, I, and J diverging from said thread D on its inner side, and additional short grooves O, O, O, diverging from said grooves in a more nearly axial direction, and receiving, intermediate of their length, and being intersected by the extremities of the said grooves D', H, I, J, all of said grooves beyond the said points of divergence becoming shallower until they merge into the said smooth grinding portion, substantially as and for the purposes set forth.

In testimony whereof I affix my signature in presence of two witnesses.

WILLIAM T. DAVIS.

Witnesses:
JESSE ARTHUR,
A. W. LANE.